Dec. 1, 1970  K. SILVON  3,543,612
CLAMP-ON TOP FILERS

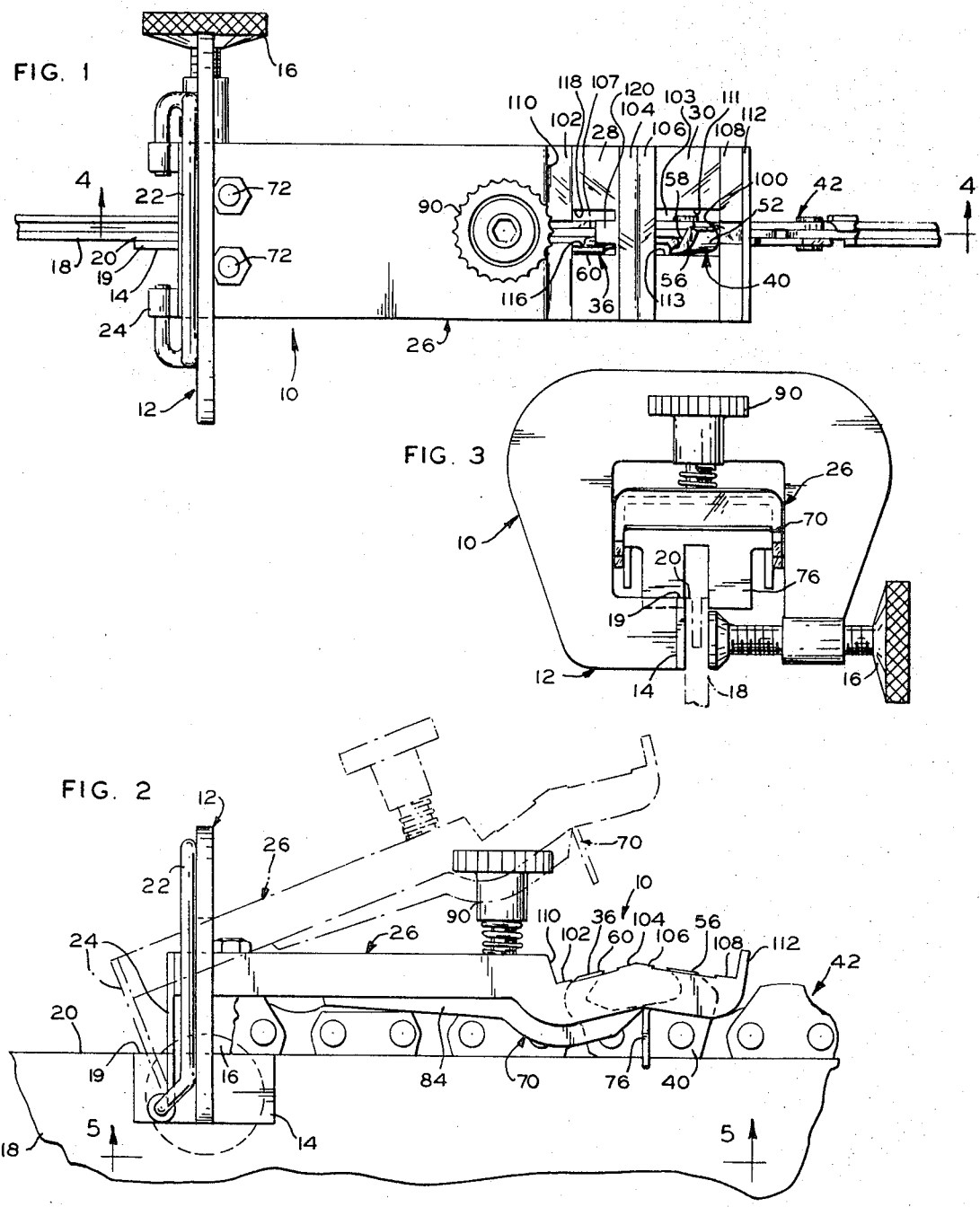

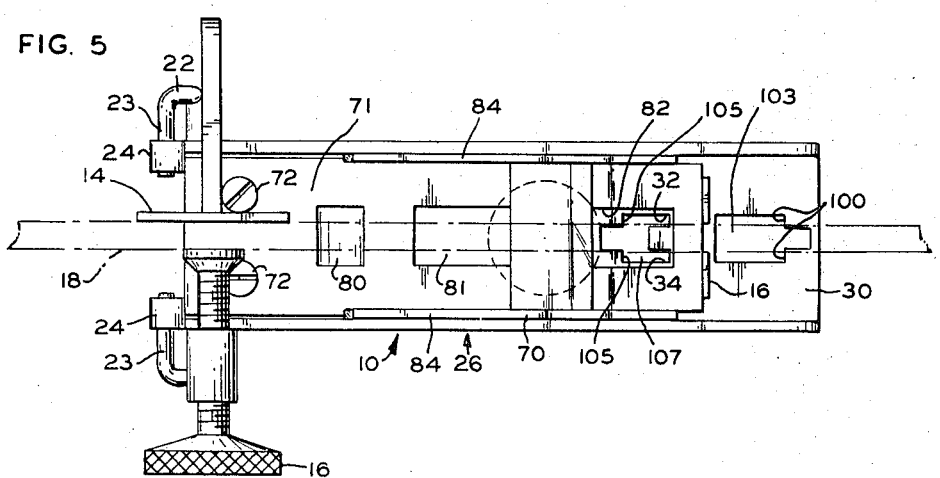
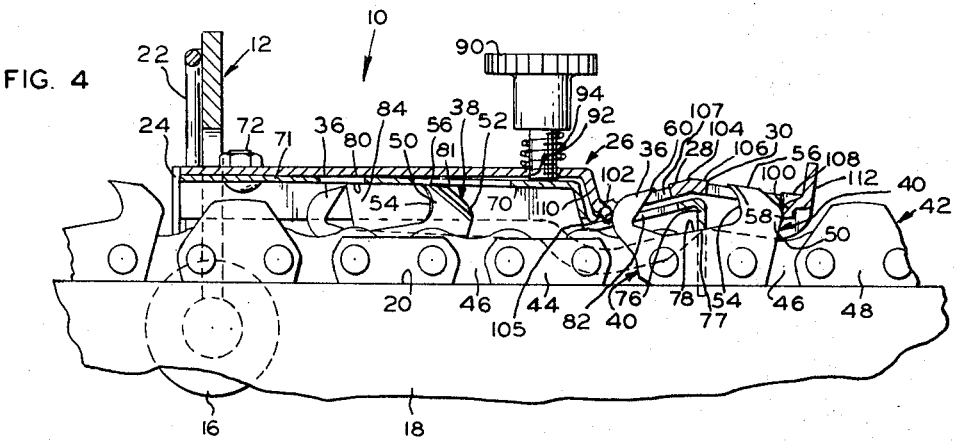

Filed Jan. 15, 1968  3 Sheets-Sheet 3

KAY SILVON
INVENTOR

BY
BUCKHORN, BLORE, KLARQUIST & SPARKMAN
ATTORNEYS

United States Patent Office 3,543,612
Patented Dec. 1, 1970

3,543,612
CLAMP-ON TOP FILERS
Kay Silvon, Portland, Oreg., assignor to Omark Industries, Inc., Portland, Oreg., a corporation of Oregon
Filed Jan. 15, 1968, Ser. No. 697,696
Int. Cl. B23d 63/08
U.S. Cl. 76—31
12 Claims

ABSTRACT OF THE DISCLOSURE

A top filer 10 (FIGS. 1 to 5) has a depth of cut gauging plate 70 carried by a file guiding arm 26 pivotal on a C-clamp frame 12 between a sharpening position and a position permitting movement of a saw chain 42 along a saw bar 18. The plate 70 has an edge 77 which engages a gullet portion 78 of a cutter link 38 or 40 in the sharpening position, and is spring urged toward the arm 26. An adjustment screw 90 limits the movement of the plate 70 toward the arm 26. A screw 16 and a clamp pad 14 flush with the top edge of the saw bar rigidly secure the frame 12 to the saw bar. Tabs 100 and 102 of the arm 26 engage the depth gauge 36 and the shank 50 of each cutter link to locate it precisely. A top filer 150 (FIGS. 6 to 8) is similar to the top filer 10 but includes a tab 164 engaging top edge surface 56 of a cutter link and an edge 166 engaging the gullet portion 78 of another cutter link to precisely locate the filer 150 on the saw bar prior to clamping a C-clamp frame 160 to the saw bar at the start of a filing operation on the saw chain.

DESCRIPTION

This invention relates to top filers, and more particularly to clamp-on top filers for sharpening saw chains while on saw bars of chain saws.

An object of the invention is to provide improved top filers.

Another object of the invention is to provide clamp-on top filers for sharpening saw chains while on saw bars of chain saws.

A further object of the invention is to provide a top filer which can be clamped on a saw bar and sharpen an entire saw chain without change in the position in which the top filer is clamped on the saw bar.

Another object of the invention is to provide top filers which maintain a uniform height differential between depth gauges and top plates throughout the life of a saw chain sharpened therewith.

Another object of the invention is to provide top filers which permit rapid shifting of saw chains to sequentially locate cutter links in sharpening positions.

The invention provides top filers each provided with a clamping means for precisely locating the filer on a saw bar of a chain saw and having an arm provided with file guiding means and means precisely locating each cutter link longitudinally in a sharpening position. Gauging means adjustable relative to the arm engage each cutter link in the sharpening position to hold the cutter link against the saw bar and locate the arm to provide a precise depth of cut to be made on the cutter link. In a top filer forming an alternate embodiment of the invention, a file guiding arm has a tab for engaging a cutter link spaced from the cutter link in the sharpening position to locate the filer precisely on a saw bar prior to actuation of clamping means to clamp the filer on the saw bar.

In the drawings:

FIG. 1 is a top plan view of a top filer forming one embodiment of the invention in operative position on a chain saw having a saw chain to be sharpened;

FIG. 2 is a side elevation view of the top filer of FIG. 1;

FIG. 3 is an end view of the top filer of FIG. 1;

FIG. 4 is an enlarged vertical sectional view taken along line 4—4 of FIG. 1;

FIG. 5 is a bottom plan view taken along line 5—5 of FIG. 2;

Figure 6:
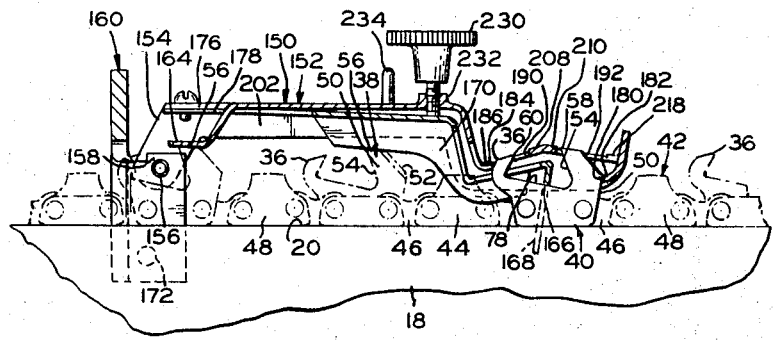
FIG. 6 is a vertical sectional view of a top filer forming an alternate embodiment of the invention.

A top filer 10 (FIGS. 1 to 5) forming one embodiment of the invention includes a C-clamp frame 12 having a rectangular clamping pad 14 and carrying a hand-actuated clamping screw 16. The frame 12 is clamped to a saw bar 18 of a chain saw with upper edge 19 of the clamping pad 14 flush with upper edge 20 of the saw bar. The frame 12 carries rigidly thereon a stiff hinging wire 22 on end portions 23 of which hinging plates 24 rigidly carrying a file guiding arm 26 is pivoted. The arm 26 is channel-like in transverse cross section and has angular file guiding plate portions 28 and 30. The plate portion 28 has slots 32 and 34 for depth gauges 36 of right and left hand cutter links 38 and 40 of a top sharpening saw chain 42. The saw chain also includes side links 44, center drive links 46 and guard links 48. The center links 38 and 40 have shank portions 50 and inclined top plates 52. The shank portions have kerf side slitting edges 54, and the top plates have top edge surfaces 56 to be filed or ground to sharpen kerf top cutting edges 58. The depth gauges 36 have top edge surfaces 60 to be filed or ground to provide the desired difference in height between the depth gauges and the kerf top cutting edges 58.

An arm-like hold-down plate 70 (FIGS. 4 and 5) has a spring metal shank 71 fastened by screws 72 rigidly to the portion of the arm 26 near the pivot end thereof. The shank 71 urges the body portion of the plate 70 toward the arm 26. The plate 70 has a forked or slotted hold-down arm 76 having a hold-down edge 77 and rigid with the body portion thereof and adapted to bracket the saw chain and the saw bar and engage predetermined, central portions of gullet portions 78 of the cutter links 38 and 40 to hold the cutter link to be sharpened tightly against the saw bar. Clearance holes 80 and 81 (FIGS. 4 and 5) of the plate 70 provide clearance for the depth gauge 36 and the top plate 52 of the cutter link 38 or 40 just ahead of the cutter link to be filed. A clearance hole 82 is provided in the plate 70 for the cutter links 38 and 40. The plate 70 has stiffening side flanges 84 in the portion thereof beyond the shank 71.

An adjustment screw 90 screws into a tapped bore 92 in the arm 26 and engages the plate 70 and holds the arm 26 away from the plate 70 a selected distance. A spring 94 is positioned between the head of the screw 90 and the arm 26 to hold the screw in adjusted position. The setting of the screw 90 determines the depth of cut to be made.

Elongated locating tabs 100 at the rear of the opening 103 in the plate portion 30 are adapted to engage the rear edges of the side shank portions 50 to precisely position the chain longitudinally relative to the plate 70 and the arm 26. Turned down, elongated locating tabs 105 at the front of opening 107 in the plate portion are adapted to engage the forward edges of the depth gauges 36, and, with the tabs 100, precisely locate each cutter link for filing. The plate portion 28 of the arm 26 has raised, chromed, file-grinding ribs or lands 102 and 104 lying in the same plane and adapted to guide a flat file (not shown) in filing the top surface 60 of the depth gauge to a condition flush with the ribs 102 and 104. Similarly, the plate portion 30 of the arm 26 has raised, file-grinding ribs or lands 106 and 108 lying in the same plane for guiding the flat file to file the surfaces 56 to a condition flush with the ribs 106 and 108. Sidewalls 110 and 112 keep the file from sliding off the ribs.

The file-guiding arm 26 is channel shaped for rigidity, and with the rigid hinging plates 24 forms a long, rigid, generally L-shaped arm structure with the gauging end portion of the arm 26 spaced substantially from the end portions 23 of the hinging wire 22. The plates 24 space the arm 26 and the plate 70 sufficiently above the saw chain 42 that, when the arm 26 and the plate 70 are swung to the broken line positions thereof shown in FIG. 2, the saw chain 42 can be freely slid along the saw bar 18 to locate another cutter link 38 or 40 in the position for filing.

In the operation of the filer 10 (FIG. 2), the C-clamp frame 12 is placed over the saw bar 18 in a position in which the edge 19 of the clamping pad 14 is flush with top edge 20 of the saw bar. The screw 16 then is tightened to clamp the filer to the saw bar in a precisely located position. The saw chain 42 is moved along the saw bar, if necessary, to position one of the cutter links 38 and 40 for filing. The the arm 26 and the plate 70 are swung down to locate the cutter 40 in engagement with either side supporting edge 111 or supporting edge 113 (FIG. 1), and to bring the hold-down edge 77 against the gullet portion 78 of the cutter link. Then the screw 90 is turned to position the lands 102 and 104, and 106 and 108, the desired distance below surfaces 36 and 56 to provide the desired depth of cut. The file then is moved across the surface 56 to file down the surface 56 until it is flush with the lands 106 and 108 and then is similarly employed to file down the surface 60 of the depth gauge 36 until it is flush with the lands 102 and 104. In filing a lefthand cutter link 40, the file is moved downwardly as viewed in FIG. 1 both for filing the surface 56 and for filing the surface 60, the edge 112 providing a firm support for the cutter 40 as the surface 56 is so filed and edge 116 supporting the depth gauge 36 as the surface 60 is filed. Conversely, in filing righthand cutter link 38, the file is moved upwardly as viewed in FIG. 1 both to file the cutter 40 and to file the depth gauge 36, the edge 110 firmly supporting the cutter as it is so filed and edge 118 of the opening 107 firmly supporting the depth gauge 36 as it is so filed. A tab 120 is positioned on the other side of the depth gauge 36 both for righthand cutter links 38 and for lefthand cutter links 40. After one of the cutter links 38 or 40 has been filed to sharpen it and reduce the height of its depth gauge proportionately, the arm 26 and the plate 70 are swung upwardly as a unit, the saw chain 42 is moved along the saw bar 18 to position the next cutter link for sharpening, the arm 26 and the plate are swung down again to precisely locate the latter cutter link, which then is filed.

Figure 7:
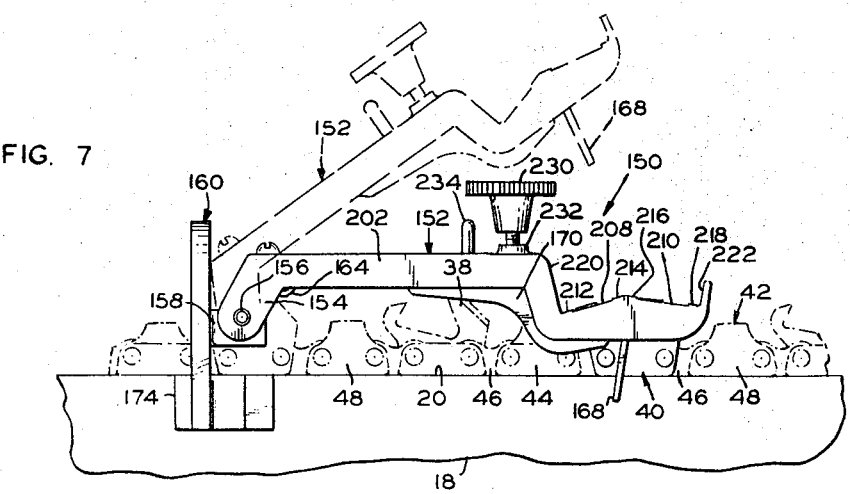
FIG. 7 is a side elevation view of the top filer of FIG. 6.
Figure 8:
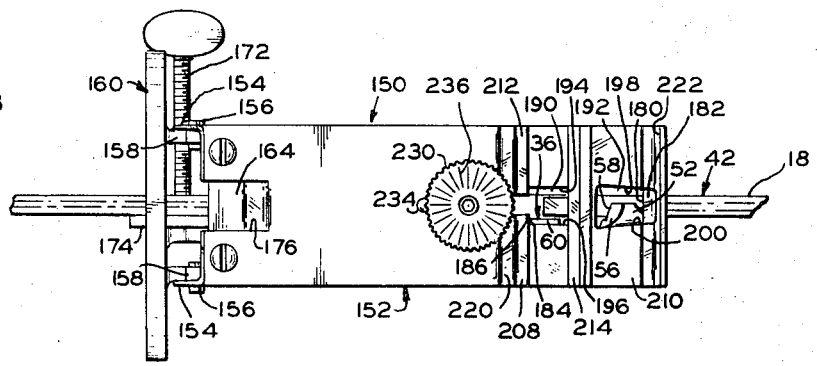
FIG. 8 is an enlarged top plan view of the top filer of FIG. 6.

EMBODIMENT OF FIGS. 6, 7 and 8

In a sharpener 150 forming an alternate embodiment of the invention, an arm 152 has hinge arm portions 154 mounted pivotally by aligned roll pins 156 on ears 158 of a C-clamp frame 160 adapted to clamp tightly to the saw bar 18 when a tab 164 is in engagement with the top surface 56 of a top plate 52 of one of the cutter links 38 and 40 of the saw chain 42 and with a gauging edge 166 of a forked member 168 of a plate 170 engaging a precise portion of the gullet 78 of the cutter link 38 or 40 in the sharpening position. A clamping screw 172 and a clamping pad 174 of the frame clamp against opposite sides of the saw bar. The tab 164 extends downwardly through a clearance slot 176 in the plate 170 positioned between two spring arm portions 178 of the plate 170. Elongated gauging edge 180 of a tab 182 engages the rear edge of shank 50 of the cutter link 38 or 40 at the sharpening position, and elongated gauging edge 184 of tab 186 engages the front edge of the depth gauge 36 of the cutter link at the sharpening position to precisely locate that cutter link longitudinally relative to the top filer. The arm 152 has openings 190 and 192 (FIG. 8) adapted to receive the depth gauges 36 and the cutters 38 and 40, side edges 194 and 196 of the opening 190 serving to firmly support the righthand and lefthand depth gauges, respectively, during filing and side edges 198 and 200 serving to firmly support the righthand and lefthand shanks 50, respectively, during filing. The arm 152 has rigidifying flanges 202 and plate portions 208 and 210 having, respectively, file supporting ribs or lands 212 and 214, and 216 and 218. Sidewalls 220 and 222 keep the file from sliding off the ribs.

An adjustment screw 230 threaded through tapped boss 232 of the arm 152 engages the plate 170 and determines the vertical spacings between the edge 168 and the lands 212, 214, 216 and 218. A pin 234 adjacent the scalloped periphery of the knob of the adjustment screw gives, with numbered radial lines 236 on the top of the knob, a visual indication of the position of the adjustment screw 230 to enable precise preselection of the depth of cut for a sharpening operation.

The above-described top filers precisely locate each cutter link 38 and 40 for uniform sharpening, permit easy shifting of the saw chain on the saw bar to bring successive links to the sharpening position, and are precisely and easily located on the saw bar at the start of each sharpening operation on the chain.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a top filer,
 a clamp adapted to be secured to a saw bar,
 a file guiding arm having top file supporting and guiding surfaces pivotally mounted on the clamp for movement between an upper position permitting movement of a saw chain along the saw bar and a filing position holding the saw chain against movement relative to the saw bar,
 and a cutter positioning member adjustably mounted on the file guiding arm,
 one of the arm and the member having a downwardly directed portion for engaging an upper edge of a cutter link of the saw chain to hold the cutter link against the saw bar during filing of the cutter link and the other of the arm and the member having spaced portions adapted to engage opposite ends of the cutter link to hold the cutter link against movemen along the saw bar during filing of the cutter link.

2. The top filer of claim 1 wherein the spaced portions are on the file guiding arm and the downwardly directed portion is on the cutter positioning member.

3. The top filer of claim 2 wherein the arm is provided with a slot therein providing clearance for the depth gauge of the cutter link and also has a slot providing clearance for the top plate of the cutter link.

4. The top filer of claim 3 wherein the arm includes tabs at the ends of the slots for engaging the forward edge of the depth gauge and the rear edge of the shank portion of the cutter link.

5. The top filer of claim 1 wherein the cutter positioning member includes a tab for engaging a top surface of a top plate of a cutter link spaced along the saw chain from the first-mentioned cutter link.

6. The top filer of claim 1 wherein the cutter positioning member includes a leaf spring shank portion secured to the file guiding arm and biasing the member toward the arm.

7. The top filer of claim 6 including an adjustment screw threadedly carried by the arm and engaging the cutter positioning member to hold the member a selected distance away from the arm.

8. The top filer of claim 1 wherein the downwardly directed portion is adapted to engage the top edge of the gullet portion of the cutter link.

9. The top filer of claim 1 wherein the clamp includes a pad member having an edge adapted to be flush with the edge of the saw bar when the clamp is positioned correctly on the saw bar.

10. In a top filer, a C-clamp adapted to be clamped to a saw bar, a downwardly facing channel-like arm, pintle means pivotally mounting one end portion of the arm on the C-clamp, the other end portion of the arm having adjacent, angularly disposed plate portions having a slot for receiving a depth gauge of a cutter link and a slot for receiving a top plate of the cutter link, said other end portion of the arm having tabs at opposite ends of the slots for engaging the forward edge of the depth gauge and the rear edge of the shank of the cutter link, an elongated plate-like member pivotally secured to the arm and having a forked portion adapted to bracket and engage the edge of the gullet portion of the cutter link to hold the cutter link against the saw bar, and means for adjusting the position of the member relative to the arm.

11. In a top filer, a cutter positioning member adapted to be placed over a cutter link of a saw chain on a saw bar and to engage a portion of the body of the link and press the link downwardly against the saw bar, a file guiding member adjustably mounted on top of the cutter positioning member and having a guide surface adapted to guide a file across the top end surface of a cutter plate of the link, the members having stop means adapted to engage both ends of the link to hold the link against longitudinal movement of the link, and means mounting the file guiding member adjustably toward and away from the cutter positioning member to adjust the depth of cut.

12. The top filer of claim 11 wherein the stop means are on the file guiding member.

References Cited

UNITED STATES PATENTS

| | | | |
|---|---|---|---|
| 2,736,216 | 2/1956 | Paradis et al. | 76—31 |
| 2,818,752 | 1/1958 | Granberg | 76—31 |
| 3,093,016 | 6/1963 | Spence. | |
| 2,633,761 | 4/1953 | Butts | 76—31 |

BERNARD STICKNEY, Primary Examiner

U.S. Cl. X.R.

76—25